United States Patent [19]
Lundström

[11] Patent Number: 5,476,346
[45] Date of Patent: Dec. 19, 1995

[54] CUTTING INSERT FOR CHIPFORMING MACHINING

[75] Inventor: Jan Lundström, Sandviken, Sweden

[73] Assignee: Sandvik AB, Sweden

[21] Appl. No.: 82,100

[22] Filed: Jun. 28, 1993

[30] Foreign Application Priority Data

Jul. 2, 1992 [SE] Sweden .................. 9202038

[51] Int. Cl.⁶ .................................................. B23P 15/28
[52] U.S. Cl. ........................................ 407/114; 407/116
[58] Field of Search ........................... 407/113–116

[56] References Cited

U.S. PATENT DOCUMENTS

| | | | |
|---|---|---|---|
| 3,815,192 | 6/1974 | Ohtsu et al. | 29/95 R |
| 3,973,308 | 8/1976 | Lundgren | 29/95 R |
| 4,214,845 | 7/1980 | Mori | 407/114 |
| 4,561,809 | 12/1985 | Porat et al. | |
| 4,597,696 | 7/1986 | Maeda et al. | |
| 4,787,784 | 11/1988 | Bernadic et al. | 407/114 |
| 4,859,122 | 8/1989 | Patterson et al. | |
| 4,941,780 | 7/1990 | Takahashi | |
| 5,000,626 | 3/1991 | Bernadic et al. | |
| 5,044,839 | 9/1991 | Takahashi | 407/114 |
| 5,141,367 | 8/1992 | Beeghly et al. | 407/114 |

FOREIGN PATENT DOCUMENTS

| | | |
|---|---|---|
| 0506078 | 9/1992 | European Pat. Off. |
| 0508073 | 10/1992 | European Pat. Off. |
| 1611583 | 12/1990 | U.S.S.R. |

OTHER PUBLICATIONS

Two-page Derwent abstract 91-309265/42, corresponds to Soviet Union 1 611 583.

*Primary Examiner*—Bruce M. Kisliuk
*Assistant Examiner*—Eileen P. Morgan
*Attorney, Agent, or Firm*—Burns, Doane, Swecker & Mathis

[57] ABSTRACT

A cutting insert for chipforming machining of metal workpieces is disclosed, which comprises top and bottom surfaces and side walls therebetween. A land area extends around the entire insert and a descending surface joins the inner margin of the land. An elongated rib is provided at each corner region which rib terminates at a certain distance from the descending surface. Two distantly provided chipbreaking projections are provided at a forward nose portion of the elongated rib in order to facilitate chipbreaking at small depths of cut and moderate feed.

9 Claims, 1 Drawing Sheet

CUTTING INSERT FOR CHIPFORMING MACHINING

BACKGROUND AND SUMMARY OF THE PRESENT INVENTION

The present invention relates to a cutting insert for chipforming machining of workpieces of metal, and in particular to triangular, square, rhombic, rhomboidic or other forms of indexable cutting inserts used with toolholders.

The basic form of such cutting inserts comprises two opposed top and bottom surfaces and a peripheral wall extending therebetween. The cutting edges are formed by the transition between the top surface and the peripheral wall of the insert. The top surface of the insert is a chip face or such a surface which is in contact with the formed chip at the cutting operation, and the peripheral wall is a clearance face in relation to the workpiece.

It is generally desirable that these inserts should have a geometry that will minimize the power required in the metalworking operations by controlling the geometry of the chips produced and that the insert chip control geometry should be capable of controlling chips over a wide range of parameters, such as depth of cut or feed rate.

Typical prior art inserts known to applicant are U.S. Pat. Nos. 3,815,192 and 3,973,308. In the former patent, a plurality of projections are spaced so as to define chip curling zones therebetween and in the latter patent a plurality of notches were formed such that the chip could pass or slide over the notches without being broken or substantially deformed.

The insert of the present invention has a chip face that is modified to have a more favorable form so as to enable chips to be broken and controlled over a wider range of cutting depth and feed.

BRIEF DESCRIPTION OF THE DRAWINGS

The invention will now be more closely described in connection with the appended drawings showing preferred embodiments of the insert, wherein further characterizing features and advantages will be apparent and wherein like members bear like reference numerals.

DETAILED DESCRIPTION OF THE PREFERRED EMBODIMENTS

Figure 1:
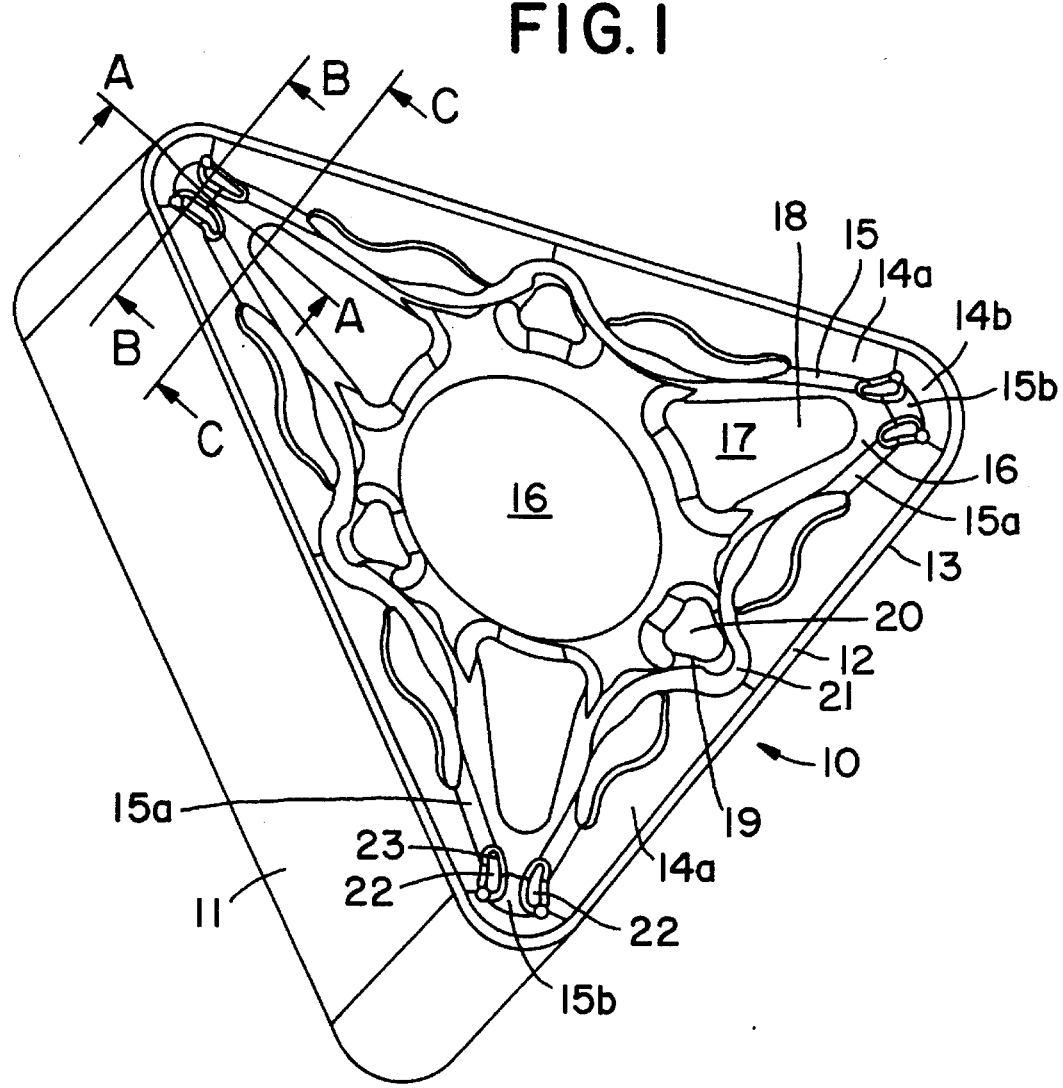
FIG. 1 is a perspective view of an indexable cutting insert according to the invention.
Figure 2:
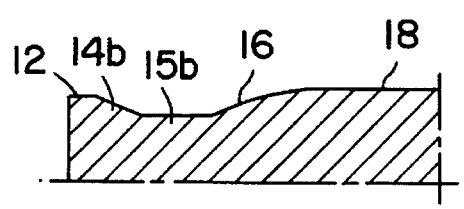
FIG. 2 is a sectional view taken along the line A—A in FIG. 1.
Figure 3:
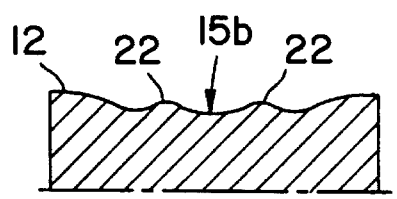
FIG. 3 is a sectional view taken along the line B—B in FIG. 1.
Figure 4:
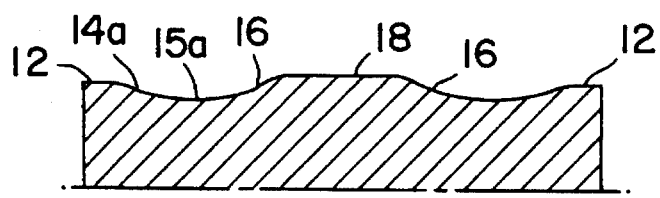
FIG. 4 is a sectional view taken along the line C—C in 20 FIG. 1.

With reference to FIG. 1, the illustrated cutting insert 10 is made of hard wear resistant material such as hard metal, and it is provided with substantially triangular top and bottom chip breaking surfaces joined by side walls 11 with rounded corners. The side walls 11 are in perpendicular relation to planes containing the top and bottom chipbreaking surfaces. The insert 10 further includes a plurality of cutting edges 13 extending along all the edges of the insert at the junction of the side walls and the top and bottom chipbreaking surfaces. Each cutting edge 13 is joined to a cutting edge land area 12 which extends inwardly from the cutting edge. This land area 12 is planar and perpendicular to the side wall 11. This land area is located to reinforce the cutting edge in the difficult areas and decrease the contact between chips and cutting face in order to delay the crater wear effect.

A sloping or descending surface 14a extends from the top inner margin of each land area 12 and joins a first planar floor portion 15a adjacent the corner region. The planar floor portion 15a is oriented parallel to the bottom surface of the insert. This floor 15a is elongated and extends symmetrical at each side of the bisector of the corner of the insert and extends substantially parallel with the cutting edge 13. An insert aperture 16, arranged normal to the planar floor portion 15a, is provided in the center of the insert 10 for the receipt of a suitable locking pin employed to clamp the insert to a pocket wall of a tool holder.

The planar floor 15a joins a sloping surface 16 of a raised rib 17, the upper surface 18 of which is planar with and located at a level equal to or above the level of the land area 12. The rib 17 is elongated and confined by the sloping surfaces 16 which converge towards the corner in such a way that the bisector along the line A—A divides the rib 17 in two equal halves. In the intermediate portion of the insert, between the ribs 17 at two adjacent corners, there is a projection 19 with a top planar surface 20 in the form of an equilateral triangle aimed to give assisting chipbreaking at greater depths of cut. In similarity with the rib 17, the projection 19 joins a planar floor 21 which has a curved form at the nose portion of the projection as a consequence of the orientation of the triangle which is oriented such that the bisector at one of its corners is oriented perpendicularly to the cutting edge 13.

At the forward nose portion of each rib 17, two distantly provided projections 22 are disposed in the sloping surface 16 of the rib with a planar floor portion 15b arranged therebetween. These projections are displaced rearwardly relative to the cutting edge and are separated from one another as shown in FIG. 1. The floor portion 15b is coplanar with the floor portion 15a. These projections 22 are elongate in shape and are partially disposed in the sloping surface 16. The projections are mutually parallel as they extend onwards over the entire width of the planar floor portion 15b towards the corner of the insert. Rear portions 23 of the projections 22 diverge as they extend inwardly toward the center of the insert. The upper surface of each of the projections 22 is substantially flat and each projection is confined by inclined descending surfaces.

The upper surface of the projections 22 is located at a level equal to or below the level of the land area 12 that extends around the insert. Further, the top surface of the distantly provided projections 22 is located at a level equal to or below the level of the top surface 18 of the elongated rib 17. The elongated rib 17 is provided with a length which is several times greater than the length of the distantly provided projections 22.

By providing two distantly arranged projections 22 at the forward nose end portion of the elongated rib 17, the initial chipbreaking will occur against the projection during light cutting, i.e., at small cutting depths and moderate feeds. When cutting depth and feed is increased the angle of shear for the chip will be changed. These distantly arranged projections 22 will therefore not negatively effect the chipbreaking at increased depth of cut and increased feed since the elongated rib will ensure that appropriate chipbreaking occurs at those conditions. Thanks to this arrangement a wider range of controlled chipbreaking is achieved at varying depths of cut and feeds.

The principles, preferred embodiments and mode of operation of the present invention have been described. Variations and changes may be made and are contemplated within the invention to the extent such variations and changes fall within the scope of the appended claims.

I claim:

1. A cutting insert for chipforming machining of metal workpieces in the shape of a polygonal body of wear resistant material, comprising opposed top and bottom surfaces and a plurality of peripheral walls extending therebetween, cutting edges being formed at a transition between the peripheral walls and at least one of the top and bottom surfaces, a land area joining the cutting edge and extending rearwardly towards a center of the insert, a descending surface joining an inner margin of the land area, a number of spaced projections being provided adjacent the descending surface in spaced relationship to the cutting edges to define chip curling zones therebetween, the descending surface from each land joining a flat bottom surface area which then joins an upwardly sloping area of an elongated rib, and two distantly provided projections being provided at a forward nose end portion of the elongated rib and arranged symmetrically at art intersection between a forwardly sloping end surface of the elongated rib and the flat bottom surface area, the distantly provided projections diverging away from each other at an end remote from the cutting edge.

2. The cutting insert as defined in claim 1, wherein the two distantly provided projections are elongated and substantially straight having such orientation that the rear portions of the projection diverge from each other in a direction towards the center of the insert.

3. The cutting insert as defined in claim 1, wherein each of said two distantly provided projections is confined by a flat top surface and inclined descending surfaces on both sides thereof, said inclined depending surfaces joining the flat bottom surface area.

4. The cutting insert as defined in claim 1, wherein the top surface of the said elongated rib extends towards a corner in the direction of a bisector, the top surface being planar and located at a level equal to or above the level of the top surface of the distantly provided projections at the nose portion of said elongated rib.

5. The cutting insert as defined in claim 1, wherein a level of the top surface of the distantly provided projections at the nose portion of the elongated rib is located at a level equal to or below the level of the land area that extends around the insert.

6. The cutting insert as defined in claim 1, wherein the elongated rib is provided along a bisector in each corner region of the insert and has a length which exceeds the length of the distantly provided projections.

7. The cutting insert as defined in claim 1, wherein the elongated rib is generally triangular in shape.

8. A cutting insert for chipforming machining of metal workpieces in the shape of a polygonal body of wear resistant material, comprising opposed top and bottom surfaces and a plurality of peripheral walls extending therebetween, cutting edges being formed at transition between the peripheral walls and at least one of the top and bottom surfaces, a land area joining the cutting edge and extending rearwardly towards a center of the insert, a descending surface joining an inner margin of the land area, a number of spaced projections being provided adjacent the descending surface in spaced relationship to the cutting edges to define chip curling zones therebetween, the descending surface from each land joining a flat bottom surface area which then joins an upwardly sloping area of an elongated rib, and additional projections provided at a forward nose end portion of the elongated rib and spaced from the cutting edge, the additional projections being arranged symmetrically about a bisector of each corner of the insert and being arranged at the intersection between a forwardly sloping end surface of the elongated rib and the flat bottom surface area, the additional projections diverging away from each other at an end remote from the cutting edge.

9. The cutting insert as defined in claim 8, wherein the additional projections are arranged at a forward nose portion of the elongated rib.

\* \* \* \* \*